US008318881B2

(12) United States Patent
Fechner et al.

(10) Patent No.: US 8,318,881 B2
(45) Date of Patent: Nov. 27, 2012

(54) NON-ANIONIC WATER-SOLUBLE ADDITIVES

(75) Inventors: Bjoern Fechner, Eppstein (DE); Carsten Schaefer, Muehldorf am Inn (DE); Alexander Woerndle, Frankfurt am Main (DE)

(73) Assignee: Clariant Finance (BVI) Limited, Tortola (VG)

( * ) Notice: Subject to any disclaimer, the term of this patent is extended or adjusted under 35 U.S.C. 154(b) by 389 days.

(21) Appl. No.: 12/451,411

(22) PCT Filed: Apr. 29, 2008

(86) PCT No.: PCT/EP2008/003455
§ 371 (c)(1), (2), (4) Date: Nov. 9, 2009

(87) PCT Pub. No.: WO2008/138485
PCT Pub. Date: Nov. 20, 2008

(65) Prior Publication Data
US 2010/0137537 A1    Jun. 3, 2010

(30) Foreign Application Priority Data

May 10, 2007    (DE) .................. 10 2007 021 868

(51) Int. Cl.
C08F 118/02 (2006.01)
C08F 124/00 (2006.01)
C08F 226/06 (2006.01)

(52) U.S. Cl. ........ 526/319; 526/240; 526/277; 526/287; 526/312; 526/320

(58) Field of Classification Search .................. 526/319, 526/240, 277, 287, 312, 320
See application file for complete search history.

(56) References Cited

U.S. PATENT DOCUMENTS

| | | | |
|---|---|---|---|
| 4,156,616 A | 5/1979 | Dietz et al. | |
| 5,484,851 A | 1/1996 | Fock | |
| 5,798,425 A * | 8/1998 | Albrecht et al. | 526/271 |
| 6,211,317 B1 * | 4/2001 | Albrecht et al. | 526/271 |
| 6,511,952 B1 | 1/2003 | Schwartz | |
| 6,582,510 B1 | 6/2003 | Schwartz | |
| 7,629,411 B2 | 12/2009 | Becker et al. | |
| 7,905,955 B2 | 3/2011 | Fechner et al. | |
| 7,938,900 B2 | 5/2011 | Fechner et al. | |
| 2002/0019459 A1 * | 2/2002 | Albrecht et al. | 523/161 |
| 2002/0137865 A1 | 9/2002 | Haubennestel et al. | |
| 2003/0209695 A1 * | 11/2003 | Tsuzuki et al. | 252/363.5 |
| 2008/0275166 A1 | 11/2008 | Becker et al. | |
| 2008/0293874 A1 | 11/2008 | Schrod et al. | |
| 2009/0234062 A1 | 9/2009 | Kok et al. | |
| 2010/0137536 A1 | 6/2010 | Fechner et al. | |
| 2011/0065879 A1 | 3/2011 | Fechner et al. | |
| 2011/0107803 A1 | 5/2011 | Fechnr et al. | |
| 2011/0185781 A1 | 8/2011 | Fechner et al. | |
| 2011/0213094 A1 | 9/2011 | Fechner et al. | |
| 2011/0244385 A1 | 10/2011 | Fechner et al. | |

FOREIGN PATENT DOCUMENTS

| | | |
|---|---|---|
| DE | 2638946 | 3/1978 |
| DE | 10200402799 | 3/2006 |
| DE | 102005019384 | 11/2006 |
| DE | 102006049804 | 4/2008 |
| EP | 1081169 | 3/2001 |
| EP | 1293523 | 3/2003 |
| EP | 1562696 | 6/2004 |

OTHER PUBLICATIONS

PCT International Search Report for PCT/EP 2008/003455, mailed Sep. 22, 2008.
English Translation of the PCT International Preliminary on Patentability for PCT/EP 2008/003455, mailed Dec. 3, 2009.
English Abstract for DE 102006049804, Apr. 24, 2008.

* cited by examiner

*Primary Examiner* — Michael M Bernshteyn
(74) *Attorney, Agent, or Firm* — Anthony A. Bisulca

(57) ABSTRACT

The invention relates to a copolymer that can be obtained by the polymerisation of monomers (A), (B) and (C), (A) being a monomer of formula (I), in which A represents a $C_2$ to $C_4$alkene and B represents a $C_2$ to $C_4$alkene that is different from A, R represents hydrogen or methyl, m is a number between 1 and 500, n is a number between 1 and 500, (B) is an ethylenically unsaturated monomer containing an aromatic group and (C) is an ethylenically unsaturated monomer containing an alkyl radical. The claimed copolymers are suitable for use as dispersants for pigments.

15 Claims, No Drawings

NON-ANIONIC WATER-SOLUBLE ADDITIVES

The present invention relates to novel nonionic copolymers, which are used as dispersants for waterborne pigment formulations, and to a process for producing these copolymers.

Dispersing pigments in liquid media typically requires dispersants. Dispersants, augmented by suitable surfactants, also known as welters, act as surface-active agents in promoting the wetting of the pigments to be dispersed, and facilitate the deconstruction of agglomerates and aggregates when producing pigment dispersions, which is generally accomplished with the aid of a grinding operation in order that high mechanical forces may be introduced into the system. Dispersants can be of anionic, cationic, amphoteric or neutral structure. They can be of low molecular weight, or represent high molecular weight polymers which constitute a random, alternating, blocklike, comblike or star-shaped architecture of the polymerized monomers. Examples of where dispersants are of particular commercial importance are the dispersing of pigments in the manufacture of pigment concentrates (used for coloration of emulsion and varnish colors, paints, coatings and printing inks) and also the coloration of paper, cardboard and textiles.

Comb polymers are usually prepared using macromonomers based on mono(meth)acrylic esters as comonomers, and they differ from other polymeric dispersants in that they have a clearly ordered structure wherein hydrophobicity and hydrophilicity, or polarity, can be apportioned between the main chain and the side chains.

EP 1 293 523 describes a dispersant which is a polymer which has a weight average molecular weight of about 5000 to 100 000 and comprises 20% to 80% by weight of a hydrophilic backbone and 80% to 20% by weight of macromonomeric side chains. The backbone consists of 70% to 98% by weight, based on the weight of the backbone, of polymerized ethylenically unsaturated monomers free of any carboxyl groups, and also 2% to 30% by weight of polymerized ethylenically unsaturated monomers bearing a carboxyl group, wherein at least 10% of the carboxyl groups are neutralized with an amine or an inorganic base. The backbone is hydrophilic in comparison to the side chains. The side chains consist of macromonomers of polymerized ethylenically unsaturated monomers.

EP 1 081 169 describes branched polymers derived from the following mixture of monomers:
(A) 50% to 93% by weight of at least one ethylenically unsaturated monomer,
(B) 2% to 25% by weight of at least one ethylenically unsaturated macromonomer having a molecular weight of 1000 to 20 000, and
(C) 5% to 25% by weight of at least one polymerizable imidazole derivative.

EP 1 562 696 describes polymeric dispersants synthesized, in aqueous emulsion polymerization, using macromonomers consisting of polyalkylene glycol mono(meth)acrylates. The main chain of the polymer must contain ethylenically unsaturated monomers having at least one amino group.

DE 10 2005 019 384 (WO 2006 114303 A1) describes comb polymers which are synthesized from ethylenically unsaturated monomers such as alkyl (meth)acrylates and aryl (meth)acrylates in combination with a pure polyethylene glycol mono(meth)acrylate, and are used as dispersants.

However, none of the polymeric dispersants presented in the references cited above is able to meet all the requirements demanded of nonionic novolak dispersants:
(i) dispersing organic pigments in high concentration above 40% to low-viscosity dispersions;
(ii) forming dispersions of high and reproducible color strength;
(iii) preventing reagglomeration of the pigment particles; and
(iv) foam completely absent from the dispersions which are widely compatible. Dispersions generally solidify during 4 weeks' storage at 50° C.

The hitherto customary novolak dispersants contain, as a consequence of their process of production, residues of alkylphenols, frequently nonylphenol, and ethoxylates thereof. Since alkylphenol ethoxylates, or their degradation products, scarcely undergo any degradation in the environment, they build up. This is problematic in that they have a hormonal effect on aquatic organisms. Therefore, many countries have adopted legislation (2003/53/EC for example) which limits or bans the use of materials containing alkylphenols or their ethoxylates in open-loop systems.

Studies to date have shown that it is still extremely difficult to synthesize dispersants that are equivalent to nonionic novolak systems. There is accordingly a need for novel dispersants that are capable of dispersing organic pigments in high concentration above 40% to low-viscosity dispersions. These dispersions shall be straightforward to produce; i.e., the pigments shall be readily wetted and be readily incorporated into the aqueous medium. The dispersion shall have a high and reproducible color strength that remains stable for a period of several years. Similarly, all further coloristic parameters such as, for example, hue angle and chroma shall be reproducible and stable. Furthermore, the dispersion shall have a low viscosity; the pigments must neither agglomerate nor flocculate nor cream up or form a sediment. The dispersion should not foam or cause or speed foaming in the application medium. Moreover, the dispersions should contribute to broad compatibility of the dispersions in various application media. Also, the dispersion shall be shear stable; i.e., its color strength or coloristics must not change under shearing, and the dispersion shall remain resistant to flocculation under these conditions.

It has now been found that, surprisingly, specific nonionic comb copolymers, prepared by means of macromonomers composed of polyethylene/polypropylene glycol mono (meth)acrylic esters, achieve this object.

The present invention accordingly provides copolymers obtainable by polymerization of monomers (A), (B) and (C), where
(A) is a monomer of formula (I)

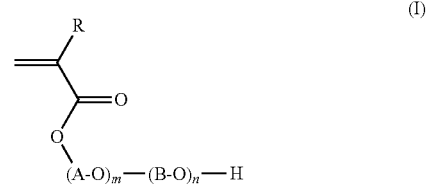

where
A represents $C_2$- to $C_4$-alkylene,
B represents a $C_2$- to $C_4$-alkylene other than A,
R represents hydrogen or methyl,
m is from 1 to 500, preferably 1 to 50;
n is from 1 to 500, preferably 1 to 50,
and the sum total of m+n is from 2 to 1000;
(B) is an ethylenically unsaturated monomer which contains an aromatic group; and (C) is an ethylenically unsaturated monomer which contains an alkyl radical.

The copolymer of the present invention has customary terminal groups which are formed by the initiation of the free-radical polymerization or by chain transfer reactions or by chain termination reactions, for example a proton, a group derived from a free-radical initiator or a sulfur-containing group derived from a chain transfer reagent.

The molar fraction of the monomers is preferably 1 to 80% for monomer (A), 0.1 to 80% for monomer (B) and 0.1 to 80% for monomer (C).

It is particularly preferable for the molar fraction of the monomers to be 10 to 70% for monomer (A), 10 to 60% for monomer (B) and 10 to 60% for monomer (C).

The alkylene oxide units $(A-O)_m$ and $(B-O)_n$ can be present either in a random arrangement or, as in the case of a preferred embodiment, in a blocklike arrangement.

In one preferred embodiment, $(A-O)_m$ represents propylene oxide units and $(B-O)_n$ represents ethylene oxide units, or $(A-O)_m$ represents ethylene oxide units and $(B-O)_n$ represents propylene oxide units, and the molar fraction of ethylene oxide units is preferably 50 to 98%, more preferably 60 to 95% and even more preferably 70 to 95%, based on the sum total (100%) of ethylene oxide and propylene oxide units.

The sum total of the alkylene oxide units can in principle be n+m=2 to 1000, although 2 to 500 is preferred, 2 to 100 is particularly preferred and 5 to 100 is even more particularly preferred.

Preferred monomers (B) can be described by the formula (IIa) or (IIb):

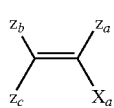

(IIa)

where
$X_a$ represents an aromatic or araliphatic radical having 3 to 30 carbon atoms which optionally contains one or more of the hetero atoms N, O and S,
$Z_a$ represents H or $(C_1-C_4)$-alkyl,
$Z_b$ represents H or $(C_1-C_4)$-alkyl, and
$Z_c$ represents H or $(C_1-C_4)$-alkyl;

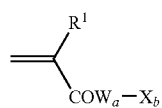

(IIb)

where
$R^1$ represents hydrogen or methyl,
$X_b$ represents an aromatic or araliphatic radical having 3 to 30 carbon atoms which optionally contains one or more of the hetero atoms N, O and S,
$W_a$ represents oxygen or an NH group.

Useful monomers (B) include for example the following esters and amides of acrylic acid and methacrylic acid: phenyl, benzyl, tolyl, 2-phenoxyethyl, phenethyl.

Further monomers (B) are vinylaromatic monomers such as styrene and its derivatives, such as vinyltoluene and alpha-methylstyrene for example. The aromatic unit may also comprise heteroaromatics, as in 1-vinylimidazole for example.

Particularly preferred monomers (B) can be: styrene, 1-vinylimidazole, benzyl methacrylate, 2-phenoxyethyl methacrylate and phenethyl methacrylate.

Preferred monomers (C) can be described by formula (III):

(III)

where
$R^2$ represents hydrogen or methyl,
Y represents an aliphatic hydrocarbyl radical having 1 to 30 carbon atoms, preferably 6 to 30, particularly 9 to 20 carbon atoms, which may be linear or branched or else cyclic, and which may contain the hetero atoms O, N and/or S and may also be unsaturated,
$W_b$ represents oxygen or an NH group.

Monomers (C) include for example the following esters and amides of acrylic acid and methacrylic acid: methyl, ethyl, propyl, isopropyl, n-butyl, isobutyl, t-butyl, pentyl, hexyl, 2-ethylhexyl, 3,3-dimethylbutyl, heptyl, octyl, isooctyl, nonyl, lauryl, cetyl, stearyl, behenyl, cyclohexyl, trimethylcyclohexyl, t-butylcyclohexyl, bornyl, isobornyl, adamantyl, (2,2-dimethyl-1-methyl)propyl, cyclopentyl, 4-ethylcyclohexyl, 2-ethoxyethyl, tetrahydrofurfuryl and tetrahydropyranyl.

Preferred monomers (C) are the following alkyl esters and alkylamides of acrylic acid and methacrylic acid: methyl, ethyl, propyl, butyl, isobutyl, 2-ethoxyethyl, myristyl, octadecyl, more preferably 2-ethylhexyl and lauryl.

The copolymers of the present invention have a molecular weight of $10^3$ g/mol to $10^9$ g/mol, more preferably of $10^3$ to $10^7$ g/mol and even more preferably of $10^3$ to $10^5$ g/mol.

It is an essential property of the polymers according to the present invention that their polyalkylene glycol side chains are not purely polyethylene glycols or polypropylene glycols. Rather, the polyalkylene glycols are either random or blocklike polyalkylene glycols composed of propylene oxide and ethylene oxide units. It is only the fine-tuning of this EO/PO ratio that provides polymeric dispersants useful for preparing highly concentrated pigment dispersions of low viscosity. The optimized ratios for the EO/PO fraction in the monomer (A) in combination with the aromatic and aliphatic monomer (B) and (C) makes it possible to emulate the properties of novolak-type dispersants such that a very similar performance profile is obtained.

In contrast to the polymers proposed ex the prior art, the polymers of the invention do not contain any monomers having free carboxylate groups. In contrast to the polymers of the present invention, polymers which have carboxylate groups on the polymer backbone are not suitable for producing pigment dispersions having high concentrations of organic pigments of above 40%, since they lead to excessively high viscosities.

The copolymers of the present invention can be produced by means of free-radical polymerization. The polymerization reaction can be carried out as a continuous operation, as a batch operation or as a semi-continuous operation. The polymerization reaction is advantageously conducted as a precipitation polymerization, an emulsion polymerization, a solution polymerization, a bulk polymerization or a gel polymerization. A solution polymerization is particularly advantageous for the performance profile of the copolymers of the present invention.

Useful solvents for the polymerization reaction include all organic or inorganic solvents which are very substantially inert with regard to free-radical polymerization reactions, examples being ethyl acetate, n-butyl acetate or 1-methoxy-2-propyl acetate, and also alcohols such as, for example, ethanol, i-propanol, n-butanol, 2-ethylhexanol or 1-methoxy-2-propanol, and also diols such as ethylene glycol and propylene glycol. It is similarly possible to use ketones such as acetone, butanone, pentanone, hexanone and methyl ethyl ketone, alkyl esters of acetic, propionic and butyric acids such as for example ethyl acetate, butyl acetate and amyl acetate, ethers such as tetrahydrofuran, diethyl ethers, and monoalkyl and dialkyl ethers of ethylene glycol and of polyethylene glycol. It is similarly possible to use aromatic solvents such as, for example, toluene, xylene or higher-boiling alkylbenzenes. The use of solvent mixtures is likewise conceivable, in which case the choice of solvent or solvents depends on the planned use of the copolymer of the present invention. Preference is given to using water; lower alcohols; preferably methanol, ethanol, propanols, iso-, sec- and t-butanols, 2-ethylhexanol, butyl glycol and butyl diglycol, more preferably isopropanol, t-butanol, 2-ethylhexanol, butyl glycol and butyl diglycol; hydrocarbons having 5 to 30 carbon atoms and mixtures and emulsions thereof.

The polymerization reaction is preferably carried out in the temperature range between 0 and 180° C., more preferably between 10 and 100° C., not only at atmospheric pressure but also under elevated or reduced pressure. If appropriate, the polymerization can also be carried out under a protective gas atmosphere, preferably under nitrogen.

The polymerization can be induced using high-energy, electromagnetic rays, mechanical energy or the customary, chemical polymerization initiators such as organic peroxides, for example benzoyl peroxide, tert-butyl hydroperoxide, methyl ethyl ketone peroxide, cumoyl peroxide, dilauroyl peroxide (DLP) or azo initiators, for example azoisobutyronitrile (AIBN), azobisamidopropyl hydrochloride (ABAH) and 2,2'-azobis(2-methylbutyronitrile) (AMBN). Similarly useful are inorganic peroxy compounds, for example $(NH_4)_2S_2O_8$, $K_2S_2O_8$ or $H_2O_2$, if appropriate in combination with reducing agents (for example sodium hydrogensulfite, ascorbic acid, iron(II) sulfate) or redox systems which contain an aliphatic or aromatic sulfonic acid (for example benzenesulfonic acid, toluenesulfonic acid) as reducing component.

The customary molecular weight regulators are used. Suitable known regulators include for example alcohols, such as methanol, ethanol, propanol, isopropanol, n-butanol, sec-butanol and amyl alcohols, aldehydes, ketones, alkylthiols, for example dodecylthiol and tert-dodecylthiol, thioglycolic acid, isooctyl thioglycolate and some halogen compounds, for example carbon tetrachloride, chloroform and methylene chloride.

The present invention further provides for the use of the copolymer of the present invention as a dispersant particularly for pigments and fillers, for example in the manufacture of waterborne pigment concentrates which are used for coloration of dispersion and varnish colors, paints, coatings and printing inks, and also for coloration of paper, cardboard and textiles.

SYNTHESIS EXAMPLE 1

A flask equipped with stirrer, reflux condenser, internal thermometer and nitrogen inlet was initially charged with 258 g of polyalkylene glycol monomethacrylate (molar mass 750, molar EO/PO ratio 6.3), 136.4 g of 2-ethylhexyl methacrylate, 71.6 g of styrene and 16.5 g of 1-dodecanethiol in 660 ml of tertiary butanol under nitrogen. Then, the initial charge was heated to 80° C. with stirring. On attainment of the reaction temperature 16.5 g of AMBN initiator, dissolved in 130 ml isobutanol, were added during 1 hour. This was followed by a further 5 hours of stirring at that temperature. After cooling to room temperature, the solvent was removed in vacuo.

Molar mass of polymer obtained: $M_w$=15 100 g/mol (by GPC, reference: polyethylene glycol).

SYNTHESIS EXAMPLE 2

A flask equipped with stirrer, reflux condenser, internal thermometer and nitrogen inlet was initially charged with 210 g of polyalkylene glycol monomethacrylate (molar mass 350, molar EO/PO ratio 1.7), 79.2 g of 2-ethylhexyl methacrylate, 41.6 g of styrene and 13.4 g of 1-dodecanethiol in 470 ml of tertiary butanol under nitrogen. Then, the initial charge was heated to 80° C. with stirring. On attainment of the reaction temperature 13.4 g of AMBN initiator, dissolved in 95 ml isobutanol, were added during 1 hour. This was followed by a further 5 hours of stirring at that temperature. After cooling to room temperature, the solvent was removed in vacuo.

Molar mass of polymer obtained: $M_w$=6900 g/mol (by GPC, reference: polyethylene glycol).

SYNTHESIS EXAMPLE 3

A flask equipped with stirrer, reflux condenser, internal thermometer and nitrogen inlet was initially charged with 258 g of polyalkylene glycol monomethacrylate (molar mass 750, molar EO/PO ratio 6.3), 87.5 g of lauryl methacrylate, 35.8 g of styrene and 9.9 g of 1-dodecanethiol in 530 ml of tertiary butanol under nitrogen. Then, the initial charge was heated to 80° C. with stirring. On attainment of the reaction temperature 9.9 g of AMBN initiator, dissolved in 110 ml isobutanol, were added during 1 hour. This was followed by a further 5 hours of stirring at that temperature. After cooling to room temperature, the solvent was removed in vacuo.

Molar mass of polymer obtained: $M_w$=14 000 g/mol (by GPC, reference: polyethylene glycol).

SYNTHESIS EXAMPLE 4

A flask equipped with stirrer, reflux condenser, internal thermometer and nitrogen inlet was initially charged with 210 g of polyalkylene glycol monomethacrylate (molar mass 350, molar EO/PO ratio 1.7), 101.6 g of lauryl methacrylate, 41.6 g of styrene and 13.4 g of 1-dodecanethiol in 500 ml of tertiary butanol under nitrogen. Then, the initial charge was heated to 80° C. with stirring. On attainment of the reaction temperature 13.4 g of AMBN initiator, dissolved in 100 ml isobutanol, were added during 1 hour. This was followed by a further 5 hours of stirring at that temperature. After cooling to room temperature, the solvent was removed in vacuo.

Molar mass of polymer obtained: $M_w$=7700 g/mol (by GPC, reference: polyethylene glycol).

SYNTHESIS EXAMPLE 5

A flask equipped with stirrer, reflux condenser, internal thermometer and nitrogen inlet was initially charged with 363 g of polyalkylene glycol monomethacrylate (molar mass 1100, molar EO/PO ratio 10.2, 70% in t-butanol), 117.3 g of lauryl methacrylate, 48.0 g of styrene and 11.1 g of 1-dodecanethiol in 730 ml of tertiary butanol under nitrogen. Then, the initial charge was heated to 80° C. with stirring. On attainment of the reaction temperature 11.1 g of AMBN initiator, dissolved in 150 ml of isobutanol, were added during 1 hour. This was followed by a further 5 hours of stirring at that temperature. After cooling to room temperature, the solvent was removed in vacuo. Molar mass of polymer obtained $M_w$=22 000 g/mol (by GPC, reference: polyethylene glycol).

SYNTHESIS EXAMPLE 6

A flask equipped with stirrer, reflux condenser, internal thermometer and nitrogen inlet was initially charged with 452 g of polyalkylene glycol monomethacrylate (molar mass 2000, molar EO/PO ratio 20.5, 70% in t-butanol), 80.4 g of lauryl methacrylate, 32.9 g of styrene and 7.6 g of 1-dodecanethiol in 780 ml of tertiary butanol under nitrogen. Then, the initial charge was heated to 80° C. with stirring. On attainment of the reaction temperature 7.6 g of AMBN initiator, dissolved in 160 ml of isobutanol, were added during 1 hour. This was followed by a further 5 hours of stirring at that temperature. After cooling to room temperature, the solvent was removed in vacuo. Molar mass of polymer obtained $M_w$=30 500 g/mol (by GPC, reference: polyethylene glycol).

SYNTHESIS EXAMPLE 7

A flask equipped with stirrer, reflux condenser, internal thermometer and nitrogen inlet was initially charged with 210 g of polyalkylene glycol monomethacrylate (molar mass 350, molar EO/PO ratio 1.7), 202.8 g of stearyl methacrylate, 62.4 g of styrene and 11.5 g of 1-dodecanethiol in 660 ml of tertiary butanol under nitrogen. Then; the initial charge was heated to 80° C. with stirring. On attainment of the reaction temperature 11.5 g of AMBN initiator, dissolved in 130 ml of isobutanol, were added during 1 hour. This was followed by a further 5 hours of stirring at that temperature. After cooling to room temperature, the solvent was removed in vacuo. Molar mass of polymer obtained $M_w$=8100 g/mol (by GPC, reference: polyethylene glycol).

SYNTHESIS EXAMPLE 8

A flask equipped with stirrer, reflux condenser, internal thermometer and nitrogen inlet was initially charged with 258 g of polyalkylene glycol monomethacrylate (molar mass 750, molar EO/PO ratio 6.3), 38.2 g of isobornyl methacrylate, 30.3 g of benzyl methacrylate and 13.2 g of 1-dodecanethiol in 470 ml of tertiary butanol under nitrogen. Then, the initial charge was heated to 80° C. with stirring. On attainment of the reaction temperature 13.2 g of AMBN initiator, dissolved in 100 ml of isobutanol, were added during 1 hour. This was followed by a further 0.5 hours of stirring at that temperature. After cooling to room temperature, the solvent was removed in vacuo. Molar mass of polymer obtained $M_w$=15 000 g/mol (by GPC, reference: polyethylene glycol).

SYNTHESIS EXAMPLE 9

A flask equipped with stirrer, reflux condenser, internal thermometer and nitrogen inlet was initially charged with 363 g of polyalkylene glycol monomethacrylate (molar mass 1100, molar EO/PO ratio 10.2, 70% in t-butanol), 39.3 g of tetrahydrofurfuryl methacrylate, 87.8 g of phenethyl methacrylate and 8.9 g of 1-dodecanethiol in 670 ml of tertiary butanol under nitrogen. Then, the initial charge was heated to 80° C. with stirring. On attainment of the reaction temperature 8.9 g of AMBN initiator, dissolved in 130 ml of isobutanol, were added during 1 hour. This was followed by a further 5 hours of stirring at that temperature. After cooling to room temperature, the solvent was removed in vacuo. Molar mass of polymer obtained $M_w$=25 800 g/mol (by GPC, reference: polyethylene glycol).

SYNTHESIS EXAMPLE 10

A flask equipped with stirrer, reflux condenser, internal thermometer and nitrogen inlet was initially charged with 452 g of polyalkylene glycol monomethacrylate (molar mass 2000, molar EO/PO ratio 20.5, 70% in t-butanol), 25.0 g of 2-ethoxyethyl methacrylate, 29.7 g of 1-vinylimidazole and 6.1 g of 1-dodecanethiol in 700 ml of tertiary butanol under nitrogen. Then, the initial charge was heated to 80° C. with stirring. On attainment of the reaction temperature 6.1 g of AMBN initiator, dissolved in 140 ml of isobutanol, were added during 1 hour. This was followed by a further 5 hours of stirring at that temperature. After cooling to room temperature, the solvent was removed in vacuo. Molar mass of polymer obtained $M_w$=26 000 g/mol (by GPC, reference: polyethylene glycol).

SYNTHESIS EXAMPLE 11

A flask equipped with stirrer, reflux condenser, internal thermometer and nitrogen inlet was initially charged with 210 g of polyalkylene glycol monomethacrylate (molar mass 350, molar EO/PO ratio 1.7), 69.0 g of lauryl acrylate, 52.8 g of benzyl methacrylate and 15.3 g of 1-dodecanethiol in 480 ml of tertiary butanol under nitrogen. Then, the initial charge was heated to 80° C. with stirring. On attainment of the reaction temperature 15.3 g of AMBN initiator, dissolved in 100 ml of isobutanol, were added during 1 hour. This was followed by a further 5 hours of stirring at that temperature. After cooling to room temperature, the solvent was removed in vacuo. Molar mass of polymer obtained $M_w$=7700 g/mol (by GPC, reference: polyethylene glycol).

SYNTHESIS EXAMPLE 12

A flask equipped with stirrer, reflux condenser, internal thermometer and nitrogen inlet was initially charged with 258 g of polyalkylene glycol monomethacrylate (molar mass 750, molar EO/PO ratio 6.3), 38.2 g of 1-vinyl-2-pyrrolidone, 107.3 g of styrene and 16.5 g of 1-dodecanethiol in 580 ml of tertiary butanol under nitrogen. Then, the initial charge was heated to 80° C. with stirring. On attainment of the reaction temperature 16.5 g of AMBN initiator, dissolved in 120 ml of isobutanol, were added during 1 hour. This was followed by a further 5 hours of stirring at that temperature. After cooling to room temperature, the solvent was removed in vacuo. Molar mass of polymer obtained $M_w$=12 100 g/mol (by GPC, reference: polyethylene glycol).

SYNTHESIS EXAMPLE 13

A flask equipped with stirrer, reflux condenser, internal thermometer and nitrogen inlet was initially charged with 452 g of polyalkylene glycol monomethacrylate (molar mass 2000, molar EO/PO ratio 20.5, 70% in t-butanol), 31.3 g of 2-ethylhexyl methacrylate, 27.8 g of benzyl methacrylate and 4.6 g of 1-dodecanethiol in 700 ml of tertiary butanol under nitrogen. Then, the initial charge was heated to 80° C. with stirring. On attainment of the reaction temperature 4.6 g of AMBN initiator, dissolved in 140 ml of isobutanol, were added during 1 hour. This was followed by a further 5 hours of stirring at that temperature. After cooling to room temperature, the solvent was removed in vacuo. Molar mass of polymer obtained $M_w$=27 000 g/mol (by GPC, reference: polyethylene glycol).

SYNTHESIS EXAMPLE 14

A flask equipped with stirrer, reflux condenser, internal thermometer and nitrogen inlet was initially charged with 363 g of polyalkylene glycol monomethacrylate (molar mass 1100, molar EO/PO ratio 10.2, 70% in t-butanol), 58.7 g of lauryl methacrylate, 43.9 g of phenethyl methacrylate and 6.7 g of 1-dodecanethiol in 630 ml of tertiary butanol under nitrogen. Then, the initial charge was heated to 80° C. with stirring. On attainment of the reaction temperature 6.7 g of AMBN initiator, dissolved in 130 ml of isobutanol, were added during 1 hour. This was followed by a further 5 hours of stirring at that temperature. After cooling to room temperature, the solvent was removed in vacuo. Molar mass of polymer obtained $M_w$=23 000 g/mol (by GPC, reference: polyethylene glycol).

SYNTHESIS EXAMPLE 15

A flask equipped with stirrer, reflux condenser, internal thermometer and nitrogen inlet was initially charged with 258 g of polyalkylene glycol monomethacrylate (molar mass 750, molar EO/PO ratio 6.3), 116.3 g of stearyl methacrylate, 70.9 g of 2-phenoxyethyl methacrylate and 9.9 g of 1-dodecanethiol in 620 ml of tertiary butanol under nitrogen. Then, the initial charge was heated to 80° C. with stirring. On attainment of the reaction temperature 9.9 g of AMBN initiator, dissolved in 120 ml of isobutanol, were added during 1 hour. This was followed by a further 5 hours of stirring at that temperature. After cooling to room temperature, the solvent was removed in vacuo. Molar mass of polymer obtained $M_w$=11 200 g/mol (by GPC, reference: polyethylene glycol).

SYNTHESIS EXAMPLE 16

A flask equipped with stirrer, reflux condenser, internal thermometer and nitrogen inlet was initially charged with 210 g of polyalkylene glycol monomethacrylate (molar mass 350, molar EO/PO ratio 0.43), 72.0 g of lauryl acrylate, 52.8 g of benzyl methacrylate and 11.1 g of 1-dodecanethiol in 480 ml of tertiary butanol under nitrogen. Then, the initial charge was heated to 80° C. with stirring. On attainment of the reaction temperature 11.1 g of AMBN initiator, dissolved in 100 ml of isobutanol, were added during 1 hour. This was followed by a further 5 hours of stirring at that temperature. After cooling to room temperature, the solvent was removed in vacuo. Molar mass of polymer obtained $M_w$=8400 g/mol (by GPC, reference: polyethylene glycol).

SYNTHESIS EXAMPLE 17

A flask equipped with stirrer, reflux condenser, internal thermometer and nitrogen inlet was initially charged with 258 g of polyalkylene glycol monomethacrylate (molar mass 750, molar EO/PO ratio 0.22), 87.5 g of lauryl methacrylate, 35.8 g of styrene and 9.9 g of 1-dodecanethiol in 530 ml of tertiary butanol under nitrogen. Then, the initial charge was heated to 80° C. with stirring. On attainment of the reaction temperature 9.9 g of AMBN initiator, dissolved in 110 ml of isobutanol, were added during 1 hour. This was followed by a further 5 hours of stirring at that temperature. After cooling to room temperature, the solvent was removed in vacuo. Molar mass of polymer obtained $M_w$=10 700 g/mol (by GPC, reference: polyethylene glycol).

SYNTHESIS EXAMPLE 18

A flask equipped with stirrer, reflux condenser, internal thermometer and nitrogen inlet was initially charged with 363 g of polyalkylene glycol monomethacrylate (molar mass 1100, molar EO/PO ratio 0.30, 70% in t-butanol), 58.7 g of lauryl methacrylate, 43.9 g of phenethyl methacrylate and 6.7 g of 1-dodecanethiol in 630 ml of tertiary butanol under nitrogen. Then, the initial charge was heated to 80° C. with stirring. On attainment of the reaction temperature 6.7 g of AMBN initiator, dissolved in 130 ml of isobutanol, were added during 1 hour. This was followed by a further 5 hours of stirring at that temperature. After cooling to room temperature, the solvent was removed in vacuo. Molar mass of polymer obtained $M_w$=24 000 g/mol (by GPC, reference: polyethylene glycol).

SYNTHESIS EXAMPLE 19

A flask equipped with stirrer, reflux condenser, internal thermometer and nitrogen inlet was initially charged with 388 g of polyalkylene glycol monomethacrylate (molar mass 750, molar EO/PO ratio 6.3), 68.2 g of 2-ethylhexyl methacrylate, 35.8 g of styrene and 11.6 g of 1-dodecanethiol in 660 ml of tertiary butanol under nitrogen. Then, the initial charge was heated to 80° C. with stirring. On attainment of the reaction temperature 11.6 g of AMBN initiator, dissolved in 130 ml of isobutanol, were added during 1 hour. This was followed by a further 5 hours of stirring at that temperature. After cooling to room temperature, the solvent was removed in vacuo. Molar mass of polymer obtained $M_w$=15 000 g/mol (by GPC, reference: polyethylene glycol).

SYNTHESIS EXAMPLE 20

A flask equipped with stirrer, reflux condenser, internal thermometer and nitrogen inlet was initially charged with 517 g of polyalkylene glycol monomethacrylate (molar mass 750, molar EO/PO ratio 6.3), 68.2 g of 2-ethylhexyl methacrylate, 35.8 g of styrene and 13.2 g of 1-dodecanethiol in 470 ml of tertiary butanol under nitrogen. Then, the initial charge was heated to 80° C. with stirring. On attainment of the reaction temperature 13.2 g of AMBN initiator, dissolved in 100 ml of isobutanol, were added during 1 hour. This was followed by a further 5 hours of stirring at that temperature. After cooling to room temperature, the solvent was removed in vacuo. Molar mass of polymer obtained $M_w$=10 000 g/mol (by GPC, reference: polyethylene glycol).

SYNTHESIS EXAMPLE 21

A flask equipped with stirrer, reflux condenser, internal thermometer and nitrogen inlet was initially charged with 280 g of polyalkylene glycol monomethacrylate (molar mass 350, molar EO/PO ratio 1.7), 79.2 g of 2-ethylhexyl methacrylate, 41.6 g of styrene and 15.3 g of 1-dodecanethiol in 480 ml of tertiary butanol under nitrogen. Then, the initial charge was heated to 80° C. with stirring. On attainment of the reaction temperature 15.3 g of AMBN initiator, dissolved in 100 ml of isobutanol, were added during 1 hour. This was followed by a further 5 hours of stirring at that temperature. After cooling to room temperature, the solvent was removed in vacuo. Molar mass of polymer obtained $M_w$=13 500 g/mol (by GPC, reference: polyethylene glycol).

SYNTHESIS EXAMPLE 22

A flask equipped with stirrer, reflux condenser, internal thermometer and nitrogen inlet was initially charged with 387 g of polyalkylene glycol monomethacrylate (molar mass 750, molar EO/PO ratio 6.3), 87.5 g of lauryl methacrylate, 35.8 g of styrene and 11.6 g of 1-dodecanethiol in 660 ml of tertiary butanol under nitrogen. Then, the initial charge was heated to 80° C. with stirring. On attainment of the reaction temperature 11.6 g of AMBN initiator, dissolved in 130 ml of isobutanol, were added during 1 hour. This was followed by a further 5 hours of stirring at that temperature. After cooling to room temperature, the solvent was removed in vacuo. Molar mass of polymer obtained $M_w$=9700 g/mol (by GPC, reference: polyethylene glycol).

SYNTHESIS EXAMPLE 23

A flask equipped with stirrer, reflux condenser, internal thermometer and nitrogen inlet was initially charged with 267 g of polyalkylene glycol monomethacrylate (molar mass 350, molar EO/PO ratio 1.7), 101.6 g of lauryl methacrylate, 41.6 g of styrene and 15.3 g of 1-dodecanethiol in 480 ml of tertiary butanol under nitrogen. Then, the initial charge was heated to 80° C. with stirring. On attainment of the reaction temperature 15.3 g of AMBN initiator, dissolved in 100 ml of isobutanol, were added during 1 hour. This was followed by a further 5 hours of stirring at that temperature. After cooling to room temperature, the solvent was removed in vacuo. Molar mass of polymer obtained $M_w$=12 000 g/mol (by GPC, reference: polyethylene glycol).

COMPARATIVE SYNTHESIS EXAMPLE 1

Copolymer According to DE 10 2005 019 384, Example 1

A 1-liter three-neck flask fitted with a thermometer, a nitrogen port, and an intensive condenser was used to dissolve 291.8 g of styrene, 603.3 g of methacrylic acid, and 209.8 g of methoxypolyethylene glycol methacrylate (1000 g/mol) (MPEG 1000 MA) (50% in $H_2O$) in tetrahydrofuran, with stirring. Then 30.2 g of dibenzoyl peroxide (75% in $H_2O$) were added and the contents of the flask were conditioned at 65° C. under a gentle stream of nitrogen. The mixture was heated under reflux for 18 hours. After that it was cooled approximately to room temperature. With vigorous stirring, in portions, 73.75 g of solid NaOH and 1.25 l of deionized water were added. After the contents of the flask had dissolved again, tetrahydrofuran, water, and unreacted styrene were removed by distillation under reduced pressure. The pressure at this point was chosen such that the temperature of the mixture did not exceed 40° C. The concentrated polymer solution was adjusted with water to a solids content of approximately 33% by weight.

USE EXAMPLE

Production of a Pigment Formulation

The pigment, in the form alternatively of powder, granulate or presscake, was pasted up in deionized water together with the dispersants and the other adjuvants and then homogenized and predispersed using a dissolver (for example from VMA-Getzmann GmbH, type AE3-M1) or some other suitable apparatus. Fine dispersion was subsequently effected using a bead mill (for example AE3-M1 from VMA-Getzmann) or else some other suitable dispersing assembly, with milling being carried out with siliquartzite beads or zirconium mixed oxide beads of size d=1 mm, accompanied by cooling, until the desired color strength and coloristics were obtained. Thereafter, the dispersion was adjusted with deionized water to the desired final pigment concentration, the grinding media separated off and the pigment formulation isolated.

Evaluation of a Pigment Preparation

Color strength and hue were determined in accordance with DIN 55986. The rub-out test was carried out by applying the emulsion paint, after mixing with the pigment dispersion, to a paint card. Subsequently, the applied coating was rubbed with the finger on the lower part of the paint card. Incompatibility was present if the rubbed area is then more strongly or brightly colored than the adjacent area not aftertreated (the rub-out test is described in DE 2 638 946). Color strength and compatibilities with the medium to be colored was determined using an emulsion paint for exteriors (waterborne, 20% $TiO_2$).

Viscosity was determined using a cone-and-plate viscometer (Roto Visco 1) from Haake at 20° C. (titanium cone: Ø60 mm, 1°), the relationship between viscosity and shear rate in a range between 0 and 200 $s^{-1}$ being investigated. Viscosities were measured at a shear rate of 60 $s^{-1}$.

To evaluate the storage stability of the dispersions, viscosity was measured directly after production of the formulation and also after four weeks' storage at 50° C.

The pigment formulation described in the example which follows was produced by the method described above, the following constituents being used in the stated amounts such that 100 parts of the pigment formulation are formed. Parts are by weight in the example:

| | |
|---|---|
| 50.0 parts | of C.I. Pigment Blue 15 |
| 7.0 parts | of polymer from synthesis example 19 |
| 2.0 parts | of wetter |
| 8.0 parts | of ethylene glycol |
| 0.2 part | of preservative |
| 32.8 parts | of water |

The pigment formulation has a high color strength in the white dispersion and is stable. The rub-out test shows no color strength differences compared with the rubbed area. The dispersion proves to be readily flowable and storage stable since it is still readily flowable after 28 days' storage at 50° C. Viscosity at the end of production is 642 mPa·s.

What is claimed is:

1. A copolymer obtained by polymerizing monomers (A), (B) and (C), wherein (A) is a monomer of formula (I)

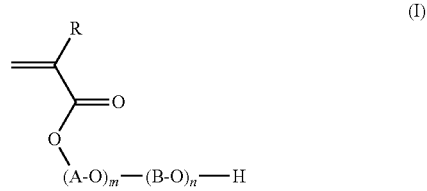

wherein

A is $C_2$- to $C_4$-alkylene,

B is a $C_2$- to $C_4$-alkylene other than A,

R is hydrogen or methyl,
m is from 1 to 500;
n is from 1 to 500,
and the sum total of m+n is from 2 to 1000;
wherein the monomer (B) is a compound of formula (IIa) or (IIb):

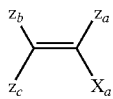

(IIa)

wherein
$X_a$ is an aromatic or araliphatic radical having 3 to 30 carbon atoms, optionally containing one or more of the hetero atoms N, O or S,
$Z_a$ is H or $(C_1-C_4)$-alkyl,
$Z_b$ is H or $(C_1-C_4)$-alkyl, and
$Z_c$ is H or $(C_1-C_4)$-alkyl;

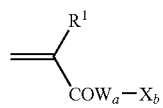

(IIb)

wherein
$R^1$ is hydrogen or methyl,
$X_b$ is an aromatic or araliphatic radical having 3 to 30 carbon atoms, optionally containing one or more of the hetero atoms N, O or S,
$W_a$ is oxygen or an NH group; and
wherein
the monomer (C) is a compound of formula (III):

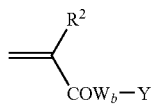

(III)

wherein
$R^2$ is hydrogen or methyl,
Y is an aliphatic hydrocarbyl radical having 1 to 30 carbon atoms, which is linear or branched or cyclic, and optionally contains hetero atoms O, N, S or a combination thereof and may also be unsaturated,
$W_b$ is oxygen or an NH group.

2. The copolymer as claimed in claim 1, wherein the molar fraction of monomer (A) is 1 to 80%, monomer (B) is 0.1 to 80% and monomer (C) is 0.1 to 80%.

3. The copolymer as claimed in claim 1, wherein the molar fraction of monomer (A) is 10 to 70%, monomer (B) is 10 to 60% and monomer (C) is 10 to 60%.

4. The copolymer as claimed in claim 1, wherein the alkylene oxide units $(A-O)_m$ and $(B-O)_n$ blocks a blocklike arrangement.

5. The copolymer as claimed in claim 1, wherein $(A-O)_m$ is propylene oxide units and $(B-O)_n$ is ethylene oxide units, or $(A-O)_m$ is ethylene oxide units and $(B-O)_n$ is propylene oxide units, and the molar fraction of ethylene oxide units is 50 to 98%, based on the sum total of ethylene oxide and propylene oxide units.

6. The copolymer as claimed in claim 5, wherein the molar fraction of ethylene oxide units is 60 to 95%, based on the sum total of ethylene oxide and propylene oxide units.

7. The copolymer as claimed in claim 1, wherein the monomer (B) is styrene, 1-vinylimidazole, benzyl methacrylate, 2-phenoxyethyl methacrylate or phenethyl methacrylate.

8. The copolymer as claimed in claim 1, wherein the monomer (C) is an alkyl ester or alkylamide of acrylic acid or methacrylic acid, wherein the alkyl is methyl, ethyl, propyl, butyl, isobutyl, 2-ethylhexyl, 2-ethoxyethyl, myristyl, lauryl or octadecyl.

9. A process for producing a copolymer as claimed in claim 1, comprising the step of free-radically polymerizing the monomers (A), (B) and (C).

10. A dispersant comprising a copolymer as claimed in claim 1.

11. The copolymer as claimed in claim 1, wherein Y is an aliphatic hydrocarbyl radical having 6 to 30 carbon atoms.

12. The copolymer as claimed in claim 1, wherein Y is an aliphatic hydrocarbyl radical having 9 to 20 carbon atoms.

13. The dispersant as claimed in claim 10, wherein the dispersant is a dispersant for pigments or fillers.

14. The copolymer as claimed in claim 1, wherein Y is an aliphatic hydrocarbyl radical having 6 to 30 carbon atoms, which is linear or branched or cyclic, and optionally contains hetero atoms O, N, S or a combination thereof and may also be unsaturated.

15. The copolymer as claimed in claim 1, wherein Y is an aliphatic hydrocarbyl radical having 9 to 20 carbon atoms, which is linear or branched or cyclic, and optionally contains hetero atoms O, N, S or a combination thereof and may also be unsaturated.

* * * * *